UNITED STATES PATENT OFFICE 2,600,420

OIL-SOLUBLE ALLYL-VINYL ESTER COPOLYMERS

Harry T. Neher, Bristol, and William L. Van Horne and La Verne N. Bauer, Philadelphia, Pa., assignors to Rohm & Haas Company, Philadelphia, Pa., a corporation of Delaware No Drawing. Application July 15, 1949, Serial No. 105,044

4 Claims. (Cl. 260—85.7)

This invention relates to oil-soluble copolymers of (A) esters from allyl and/or methallyl alcohol and a saturated aliphatic monocarboxylic acid of at least sixteeen carbon atoms and (B) esters from vinyl alcohol and a saturated aliphatic monocarboxylic acid having four to twelve carbon atoms. It concerns, likewise, compositions comprising one or more of these copolymers dissolved in a wax-containing hydrocarbon particularly a wax-bearing hydrocarbon liquid.

The thickening action obtained when a resinous material is dissolved in a solvent therefor has long been recognized. In some instances, it has been found desirable to dissolve polymeric products in hydrocarbon fluids to increase the viscosity thereof or to improve the temperature-viscosity behavior. In some instances, resinous or polymeric materials lower the pour point of the oil or fluid in which they are dissolved. In other instances, they have no effect on this property, while in still others they raise the pour point. The effect on pour point has not been predictable.

Such materials as individual polymers of allyl stearate, allyl palmitate, methallyl laurate, allyl octoate, allyl nonoate, vinyl stearate, vinyl laurate, or vinyl butyrate do not lower the pour point of lubricating oils when they are dissolved therein, even though they may thicken the oils. The previously known copolymers of allyl and vinyl esters, such as copolymers of allyl acetate and vinyl acetate, are characterized by their insolubility in aliphatic hydrocarbons and the like, including petroleum oils. Copolymers of such esters as vinyl acetate and allyl linoleate, allyl caproate, or allyl butyrate have no economic value for providing compositions of reduced pour point.

In contrast to such established facts, we have discovered a valuable class of oil-soluble copolymers which are prepared from (A) an ester of allyl or methallyl alcohol and a saturated aliphatic monocarboxylic acid, R'COOH, wherein R' is an allyl group having a hydrocarbon chain of at least fifteen carbon atoms, and (B) a vinyl ester, $CH_2=CHOOCR''$, from a saturated aliphatic monocarboxylic acid of four to twelve carbon atoms, R'' thus having a carbon content from three to eleven. We have also found that these copolymers have a marked effect in depressing the pour point of wax-containing hydrocarbon liquids.

We have further found that for the formation of useful pour point depressants there must be observed definite ratios of the two kinds of esters for the formation of the copolymers of this invention. At least one mole of the defined vinyl ester must be used per mole of the defined allyl ester and there may be used as many moles of the vinyl ester per mole of the allyl ester as the number of carbon atoms in the longest chain of the acid portion of the vinyl ester. Thus, when vinyl laurate is copolymerized with allyl palmitate, stearate, or like long chained ester, there may be used from one mole to twelve moles of vinyl laurate per mole of the said allyl ester. When vinyl octoate is used in this way, one mole to eight moles may be taken per mole of the said allyl ester. In the case of vinyl butyrate, one mole to not over four moles are to be taken per mole of allyl ester, but in the case of vinyl isobutyrate not over three moles thereof are to be taken. Similarly, the upper ratio for vinyl 2-ethylhexoate is six while the upper limit for vinyl 2-ethylbutyrate is four. The same ratios hold when methallyl palmitate, stearate, or the like is used in place of or in conjunction with the allyl esters.

The allyl and methallyl groups have here been found to be entirely interchangeable. The α-methyl group of the latter may impart some advantage through increased oil-solubility. Groups larger than methyl, however, or groups in other than the α-position seem to interfere with the preparation of suitable copolymers or at least with the practical use of such esters as components of copolymers in lubricating oils and the like.

The allyl or methallyl esters are those from long-chained saturated monocarboxylic acids having at least sixteen carbon atoms in a chain. These acids include palmitic, margaric, stearic, dicetylacetic, tricosanoic, and tetracosanoic. The preferred acids have a carbon chain of sixteen to twenty-four carbon atoms in a saturated aliphatic chain.

The vinyl esters are formed from saturated aliphatic monocarboxylic acids from isobutyric to lauric. Other typical acids are butyric, n-valeric, isovaleric, 2-methylbutanoic, pivalic, caproic, isocaproic, 2-methylpentanoic, 3-methylpentanoic, 2,2-dimethylbutanoic, 2-ethylbutanoic, n-heptoic, caprylic or n-octoic, 2-ethylhexoic, n-nonoic, isononoic, 3,5,5-trimethylhexoic, capric, undecanoic, dineopentylacetic, and methyl-tert.-butylneopentylacetic. The vinyl esters are prepared according to known procedures, such as the reaction of acetylene with carboxylic acids in the presence of a zinc catalyst or such as the transesterification of vinyl esters of lower acids with larger acids.

In place of a single allylic ester there may be used mixtures of such esters. The mixture may be obtained by actual mixing of individual allyl and/or methallyl esters of long-chained fatty acids or by use of mixtures of such acids in commercial mixtures. Similar considerations hold for the vinyl esters. With mixtures of these esters the upper limit for the proportion of such esters for copolymerizing with the allylic esters is determined by the average chain length.

For the preparation of oil-soluble copolymers from the above described esters a mixture of an allyl ester and a vinyl ester is made in an organic liquid which is a solvent for the copolymer. As solvent there may be used toluene, xylene, light mineral oils, ethylene dichloride, methyl isobutyl ketone, ethyl acetate, butyl acetate, tert-butanol, dioxane, or mixtures of these solvents, or similar hydrocarbon, halohydrocarbon ketone, ester, alcohol, or ether or mixture of such solvents in which the copolymer is soluble. Sufficient solvent is used to hold the copolymer in solution and to maintain a pourable solution.

An organic peroxide is added to the solution of the monomeric esters in organic solvent to supply catalytic action. Suitable peroxides include acetyl peroxide, caproyl peroxide, lauroyl peroxide, benzoyl peroxide, dibenzal diperoxide, di-tert-butyl diperphthalate, tert-butyl perbenzoate, 2,2-bis(tert - butyl - peroxy)butane, methyl ethyl ketone peroxide, di-tert-butyl peroxide, and tert-butyl hydroperoxide. Peroxide in an amount from 1% to 5% of the weight of the esters to be copolymerized is taken at the start and small increments of peroxide are added during the course of the copolymerization until the total weight of organic peroxide used is 4% to 13% or more of the weight of the esters taken.

The temperature of copolymerization may be from about 70° C. to 150° C. One temperature may be used at the start and another during the later stages of copolymerization. The optimum temperatures will depend on solvent, concentration of copolymerizable esters therein, catalyst, and time. In any case, these variables are selected to give a copolymer having a molecular size suitable for the intended use of the copolymer. Molecular weight of the copolymer may vary from about 1,000 to 100,000. Conditions are selected to ensure an oil-soluble copolymer and avoid formation of gels. It should be noted that the conditions here shown must be adhered to in order to produce oil-soluble polymers. If gelation should occur through failure to observe these conditions, as to temperature, presence of sufficient solvent to maintain complete solution, gradual addition of catalyst, or the like, the batch should be discarded.

It is of interest here that the improvement in viscosity index obtained by use of the copolymers of this invention is not so dependent on molecular size as it is with many other polymeric materials. Thickening action in general parallels molecular size, but depends also on the nature of the hydrocarbon oil in which the copolymers of this invention are used. For example, naphthenic hydrocarbons give greater thickening action than paraffinic oils. The effect on pour point is more dependent upon the prescribed choice of allyl and vinyl esters within the specified ratios than upon molecular size.

Typical procedures for preparing the copolymers from allyl esters and vinyl esters of the above described types follow.

Example A

A mixture was prepared from 35 g. of allyl stearate, 65 g. of vinyl laurate, and 6 g. of benzoyl peroxide in 30 g. of toluene. The mixture was introduced in increments over a period of time into a heated flask equipped with a stirrer. A stream of nitrogen gas was passed through the apparatus, which was heated on a boiling water bath. A portion of 22 g. of mixture was placed in the flask and stirred. In about seven minutes it was noticed that copolymerization had started. Thereafter at ten minute intervals for an hour and a half increments of the mixture were added. At the end of three hours a solution of 2.4 g. of benzoyl peroxide in 20 cc. of toluene was added. After the fourth hour the temperature of the solution was dropped to about 90° C. and maintained at 88° C. to 90° C. during the rest of the operation. During the fifth hour a solution of 6 g. of benzoyl peroxide in 30 cc. of toluene was added. At the end of the sixth hour 2.4 g. of benzoyl peroxide in 20 cc. of toluene was added and shortly thereafter a small amount of toluene was introduced to maintain the fluidity of the solution. At the end of six and three fourths hours 0.9 g. of benzoyl peroxide in 20 cc. of toluene was added. At the end of seven hours 72 cc. of toluene was added. Heating was discontinued, but stirring was continued for an hour. The product was a solution containing 31.5% of non-volatile material corresponding to a yield of 93.3% of copolymer. A portion of this solution was adjusted with toluene to a 30% solids content. This had a viscosity of 194.4 cs. at 100° F.

A portion of this toluene solution (42.5 g.) was mixed with 19.1 g. of an S. A. E. 10 Mid-Continent oil. The mixture was heated for three quarters of an hour at 140° C. while the pressure thereabove was reduced to 1 mm. Oil was added to bring the solids content of the solution to exactly 40%. This concentrate was particularly suitable for blending with wax-containing hydrocarbon oils to give compositions having a pour point below that of the oils alone.

Example B

The apparatus used here consisted of a flask held in an oil bath and equipped with stirrer, thermometer, reflux condenser, and dropping funnel. A mixture was made of 35 g. of allyl stearate, 65 g. of vinyl isononate (the vinyl ester of mixed isononanoic acids obtained by oxidation of the reaction products from diisobutylene, hydrogen, and carbon monoxide in the presence of a cobalt catalyst), and 5 g. of benzoyl peroxide in 30 g. of toluene. The apparatus was swept out with nitrogen and increments of the mixture run into the flask at a temperature of 115° C. Copolymerization began almost at once. All of the mixture was introduced into the flask within two hours. At 2.5 hours 2 g. of benzoyl peroxide in 10 cc. of toluene was added. After 4.5 hours the temperature of the bath was allowed to drop until it reached 100° C. At 290 minutes 5 g. of peroxide in 20 cc. of toluene was added; at 350 minutes 2 g. of peroxide in 14 cc. of toluene was added; at 410 minutes 0.8 g. of peroxide in 20 cc. of toluene was added and at 450 minutes 84 g. of toluene was added and heating discontinued. The product was a toluene solution containing 36.8% of non-volatile copolymer. A portion of this solution adjusted to 30% of copolymer had a viscosity of 48.6 cs. at 100° F.

*Example C*

The procedure described in the above examples was applied to a mixture of 10 g. of methallyl stearate, 10.1 g. of vinyl isoheptanoate, 1 g. of tert.-butyl perbenzoate, and 8.7 g. of toluene. Copolymerization was started at 102° C. and during the course of eight hours allowed to fall to 95° C. Portions of peroxide were added after 3, 5, 6, and 7 hours in a total amount of 2. g. A small amount of toluene was added to maintain fluidity. The product was found to contain 57.5% of non-volatile matter, corresponding to a yield of 94.9% of copolymer.

The same procedure was applied to copolymers from allyl palmitate and various vinyl carboxylates from butyrate to laurate, allyl tetracosanate and the same vinyl carboxylates, methallyl palmitate and the same vinyl carboxylates, and the like. In all cases in which the prescribed proportions were used and prescribed procedural steps were followed, oil-soluble copolymers were obtained which had a marked influence on the pour point of wax-bearing hydrocarbon fluids.

The oil-soluble copolymers which have been described are useful in the preparation of petroleum products of reduced pour point, that is compositions comprising wax-bearing hydrocarbon liquids in which the copolymer is dissolved and which has a lower pour point than such liquids without the copolymers. The concentration of copolymer may be as low as 0.01% in the most favorable cases and as much as 5% of copolymer may be used when pour depressing action is desired along with improvement in viscosity-temperature relations and thickening. In most cases concentrations of 0.05% to 1% of the weight of the compositions are entirely adequate for lowering the pour point of waxy oils.

The effect on the pour point of wax-containing hydrocarbons was determined by dissolving one of the above described copolymers in an amount sufficient to accomplish this purpose within the stated percentage limits and subjecting the solution to the A. S. T. M. pour test (D97—47). In some instances this test was supplemented with shock chilling and maximum pour tests. The maximum pour test is described in Proc. A. S. T. M. 45, Appendix I, p. 244 (1945). The shock chilling determination is made by observing the samples during the initial cooling step with the cooling jacket at −60° F.

Three oils were selected for test purposes. One was a 150 Pennsylvania neutral having a pour point of +25° F. (I) This oil proved to be relatively sensitive to pour point depressants. The second oil (II) was selected to demonstrate the pour depressing action in heavy oils. It was an S. A. E.-90 gear oil, compounded from 30 parts of a 180 Pennsylvania neutral and 70 parts of a 150 Pennsylvania bright stock, having a pour point of +25° F. A third oil (III) was a 500 Mid-Continent solvent-extracted neutral (S. A. E.-30) having a pour point of +25° F. This was known to be an oil which was not readily changed as to its pour point.

*Example 1*

(a) A copolymer was prepared from one mole of allyl stearate and one mole of vinyl butyrate in toluene. A 30% solution of the copolymer in toluene had a viscosity of 20 cs. at 100° F. Sufficient solution was mixed with Oil I to give a 0.5% solution of copolymer therein. The mixture was heated under reduced pressure to strip off the toluene. The resulting oil had a pour point of −5° F.

(b) A similar copolymer, prepared from one mole of allyl stearate and two moles of vinyl butyrate, at 0.5% in Oil I depressed the pour point to 0° F.

(c) A copolymer prepared from one mole of allyl stearate and three moles of vinyl butyrate, at 0.5% in Oil I depressed the pour point to −5° F.

*Example 2*

(a) A copolymer, prepared from one mole of allyl stearate and one mole of vinyl 2-ethylhexanoate, at 0.5% in Oil I depressed the pour point to 10° F.

(b) A similar copolymer prepared, however, from one mole of allyl stearate and three moles of vinyl 2-ethylhexanoate depressed the pour point of Oil III to −20° F. when used at 0.5%. By shock chilling this combination showed a pour point of 5° F.

*Example 3*

(a) A copolymer was prepared from one mole of allyl stearate and 2.07 moles of vinyl isoheptanoate and dissolved at 0.5% concentration in Oil I. The pour point of the resulting composition was −20° F. When the concentration was halved by mixing equal volumes of the composition and Oil I, the pour point was found to be −5° F.

(b) The above copolymer was applied to Oil III at 0.5% concentration. The pour point of the resulting composition by shock chilling was −5° F.

*Example 4*

(a) A copolymer from one mole of allyl stearate and two moles of vinyl 3,5,5-trimethylhexoate, having a degree of polymerization giving a viscosity of 48.6 cs. at 100° F. in a 30% toluene solution was taken up in Oil I. At 0.5% of copolymer the composition had a pour point of −25° F., at 0.25% of −20° F., and at 0.1% of −10° F.

(b) The same copolymer at 0.5% in Oil II caused the pour point to drop 10° F.

(c) With oil III the composition containing 0.5% of the same copolymer had a pour point of −5° F. by shock chilling.

*Example 5*

(a) A copolymer was prepared from one mole of allyl stearate and one mole of vinyl laurate. A 30% solution thereof in toluene had a viscosity of 368 cs. at 100° F. A 0.25% solution of this copolymer in Oil I had a pour point of 0° F.

(b) In Oil II at 0.1% it depressed the pour point to 10° F.

(c) In Oil III at 0.5% it depressed the pour point to 0° F.

*Example 6*

(a) Two copolymers were prepared from one mole of allyl stearate and 2.66 moles of vinyl laurate. One was carried to a degree of polymerization where it gave to a 30% solution in toluene a viscosity of 10 cs. at 100° F.; the other gave to a 30% solution in toluene a viscosity of 672 cs. at 100° F.

The first at 0.1% to 1% in Oil I caused the pour point to be −20° F. to −25° F.; at 0.1% in Oil II —10° F.; and at 0.5% in Oil III —15° F. The second at 0.5% in Oil I caused the pour point to be —25° F.; at 0.1% in Oil I —20° F.; at 0.1% in Oil II —10° F.; at 0.5% in Oil III —15° F. Maximum pour tests with Oil III and 0.5% of either copolymer were 10° F.

(b) A copolymer from one mole of allyl stearate and six moles of vinyl laurate depressed the pour point of Oil I to —20° F. when tested at 0.25% and 0.1%.

*Example 7*

A copolymer was prepared from one mole of allyl tetraconsanoate and 5.37 moles of vinyl laurate to give a polymer size at which a 30% solution in toluene had a viscosity of 167 cs. at 100° F. A 0.5% solution of this copolymer in Oil I had a pour point of —20° F.

*Example 8*

(a) A copolymer was prepared from one mole of methallyl stearate and 2.2 moles of vinyl isoheptanoate. At 0.2% to 0.5% in Oil I it gave a pour test of —25° F.

(b) A copolymer was prepared from one mole of methallyl stearate and 3.4 moles of vinyl isononanoate. At 0.5% in Oil III it gave a pour test of 5° F.

(c) A copolymer was prepared from one mole of methallyl stearate and 2.88 moles of vinyl laurate.

At 0.25% in Oil I it caused the pour point to be —20° F.; at 0.1% in Oil II 10° F.; at 0.5% in Oil III —15° F. The maximum pour point test for Oil III with 0.5% of this copolymer was 0° F.

*Example 9*

A copolymer was prepared from one mole of allyl palmitate and two moles of vinyl laurate. At 0.25% in Oil I it depressed the pour point to —20° F. and at 0.1% in Oil II to 0° F.

*Example 10*

The viscosity of Oil I was determined at 210° F. as 5.15 cs. and was found to be 30.9 cs. at 100° F. It, therefore, has a viscosity index of 106.9.

There was dissolved in 98 parts of this oil 2 parts by weight of a copolymer from one mole of allyl stearate and two moles of vinyl laurate. A 30% solution of this copolymer in toluene has a viscosity of 333 cs. at 100° F. The viscosity of the 2% solution of this copolymer in Oil I is 6.44 cs. at 210° F. and 39.1 cs. at 100° F. This corresponds to a viscosity index of 124.

The copolymers of this invention are new. They are soluble in hydrocarbon fluids and impart to the resulting solutions an increase in viscosity. They are particularly useful in petroleum fluids from paraffinic and naphthenic stocks having waxy pour points. The pour points are effectively depressed by addition to such fluids of one or more of the copolymers herein described. Other properties such as viscosity index are also improved. The copolymers are compatible with other additives, such as antioxidants, wear-resisting agents, oiliness agents, detergents, and the like.

We claim:

1. An oil-soluble copolymer of (A) an allylic ester of an alkanoic acid of sixteen to twenty-four carbon atoms and an alcohol selected from the class consisting of allyl and methallyl alcohols and (B) a vinyl ester of an alkanoic acid having four to twelve carbon atoms, the mole ratio of allylic ester groups to vinyl ester groups in the copolymer being from one to one to one to a number equalling the number of carbon atoms in the longest chain of the said alkanoic acid forming said vinyl ester.

2. An oil-soluble copolymer of (A) allyl stearate and (B) vinyl laurate, the mole ratio of groups from the allyl stearate to the vinyl laurate groups being from one to one to one to twelve.

3. An oil-soluble copolymer of (A) allyl stearate and (B) vinyl 3,5,5-trimethylhexoate, the mole ratio of groups from the allyl stearate to groups from the vinyl 3,5,5-trimethylhexoate being from one to one to one to six.

4. An oil-soluble copolymer of (A) methallyl stearate and (B) vinyl laurate, the mole ratio of groups from the methallyl stearate to groups from the vinyl laurate being from 1:1 to 1:12.

HARRY T. NEHER.
WILLIAM L. VAN HORNE.
LA VERNE N. BAUER.

REFERENCES CITED

The following references are of record in the file of this patent:

UNITED STATES PATENTS

| Number | Name | Date |
|---|---|---|
| 2,424,838 | Moffett | July 29, 1947 |
| 2,441,023 | Larsen | May 4, 1948 |

FOREIGN PATENTS

| Number | Country | Date |
|---|---|---|
| 395,478 | Great Britain | July 20, 1933 |

OTHER REFERENCES

"Allyl Alcohol," Shell Devel., 1946; pages 27 to 31 pertinent.